(12) United States Patent
Cremona et al.

(10) Patent No.: US 8,815,767 B2
(45) Date of Patent: Aug. 26, 2014

(54) MIXED OXIDES CATALYSTS

(75) Inventors: Alberto Cremona, Castell'Arquato (IT); Marvin Estenfelder, Novara (IT); Edoardo Vogna, Novara (IT)

(73) Assignee: Sued-Chemie Catalysts Italia S.R.L., Novara (IT)

(*) Notice: Subject to any disclaimer, the term of this patent is extended or adjusted under 35 U.S.C. 154(b) by 940 days.

(21) Appl. No.: 12/612,188

(22) Filed: Nov. 4, 2009

(65) Prior Publication Data

US 2010/0111795 A1 May 6, 2010

(30) Foreign Application Priority Data

Nov. 5, 2008 (EP) .................................... 08168381

(51) Int. Cl.
*B01J 23/00* (2006.01)

(52) U.S. Cl.
USPC ........... 502/302; 502/303; 502/324; 502/345; 423/599; 423/604; 423/605; 423/239.1

(58) Field of Classification Search
USPC .......... 502/302, 303, 324, 345; 423/604–605, 423/599, 239.1
See application file for complete search history.

(56) References Cited

U.S. PATENT DOCUMENTS

| | | | | |
|---|---|---|---|---|
| 5,260,248 A | * | 11/1993 | Singh et al. .................... | 502/303 |
| 2002/0064492 A1 | * | 5/2002 | Cremona et al. ........... | 423/245.3 |
| 2002/0132725 A1 | * | 9/2002 | Labarge et al. ................. | 502/64 |
| 2004/0151647 A1 | * | 8/2004 | Wanninger et al. ........... | 423/247 |

FOREIGN PATENT DOCUMENTS

| | | |
|---|---|---|
| DE | 102 52 103 A1 | 5/2004 |
| EP | 1 197 259 A | 4/2002 |

* cited by examiner

*Primary Examiner* — Kaj K Olsen
*Assistant Examiner* — Pritesh Darji
(74) *Attorney, Agent, or Firm* — Scully, Scott, Murphy & Presser, P.C.

(57) ABSTRACT

Mixed oxides catalysts usable in particular in the full oxidation to $CO_2$ and $H_2O$ of volatile organic compounds (VOC), in the decomposition of nitrogen protoxide to nitrogen and oxygen and the combustion of CO, $H_2$ and $CH_4$ off gases in fuel cells, comprising oxides of manganese, copper and $La_2O_3$ and/or $Nd_2O_3$, having a percentage composition by weight expressed as MnO, CuO, $La_2O_3$ and/or $Nd_2O_3$ respectively of 35-56%, 19-31% and 20-37%. The oxides are supported on inert porous inorganic oxides, preferably alumina.

7 Claims, No Drawings

MIXED OXIDES CATALYSTS

The present invention relates to mixed oxides catalysts comprising oxides of manganese, copper and rare earth metals, usable in particular for the full oxidation of organic compounds (VOC) to $CO_2$ and $H_2O$, the conversion of nitrogen protoxide to nitrogen and oxygen, and the combustion of CO, $H_2$ and $CH_4$ off gases from the anode of fuel cells.

BACKGROUND OF THE INVENTION

U.S. Pat. No. 5,260,248 discloses catalysts comprising oxides of manganese, copper and lanthanum having composition, expressed as MnO, CuO and $La_2O_3$, of 60-75 wt % MnO, 15-23 wt % CuO and 10-18 wt % $La_2O_3$. The thermal stability of the catalyst is not higher than 700° C.: in any case, higher than that of perovskite type catalysts, which is of about 650° C.

A typical perovskite oxidation catalyst has formula LaMn 0.5 Cu 0.5 $O_3$ (U.S. Pat. No. 3,914,389).

The catalysts of U.S. Pat. No. 5,260,248 are prepared by impregnation of alumina with aqueous solutions of nitrates of Mn, Cu and La, followed by drying and calcination at 400°-700° C.

EP 1197259 A1 describes mixed oxides catalysts comprising oxides of Mn, Cu and rare earth metals, having composition, expressed as MnO, CuO and oxides of rare earth metals at the lowest valence state, of 14-88 wt % MnO, 10-66 wt % CuO and 2-20 wt % $La_2O_3$. The preferred composition is 44-55 wt % MnO, 33-43 wt % CuO and 10-13 wt % $La_2O_3$.

The preparation of the catalysts of EP 1197259 A1, when supported on a carrier, require in the industrial scale preparation two impregnation steps made after the first impregnation with the lanthanum nitrate, each of which carried out after drying and calcination at 600° C.

The above multistep operation is expensive being labour intensive.

US 2004/0151647 A1 discloses mixed oxides catalysts of composition expressed as wt % metal: 15-30% Cu, 55-77% Mn and 7.5-10% Ce wherein Ce can be substituted with Pr or 0.2-5 wt % La.

It is an object of this present invention to provide mixed oxides catalysts suitable for the selective oxidation of VOC compounds to $CO_2$, as well as for the decomposition of nitrogen protoxide to nitrogen and oxygen and the combustion of CO, $H_2$ and $CH_4$ off gases from the anode of fuel cells, endowed of high thermal stability and high activity even after ageing at high temperatures, and not requiring in the industrial preparation more than one step impregnation after the impregnation with the lanthanum nitrate solution.

The above and other objects will be apparent from the following description of the invention.

SUMMARY OF THE INVENTION

The mixed oxides catalysts of the present invention comprise mixed oxides of Mn, Cu and rare earth metals, wherein the rare earth metals can assume multivalence states, having following composition expressed as MnO, CuO and oxides of the rare earth metals selected from the oxides of lanthanum and neodymium and mixtures thereof: 35-56 wt % MnO, 19-31 wt % CuO and 20-37 wt % $La_2O_3$ and/or $Nd_2O_3$.

DETAILED DESCRIPTION OF THE INVENTION

The preferred composition is: 40-48 wt % MnO, 26-30 wt % CuO and 26-30 wt % $La_2O_3$.

Lanthanum oxide in mixture with Ce oxides is also preferred; the g-atom content of Ce of the mixtures is less than 50% by weight with respect to the La g-atom content.

Surprisingly, the catalysts of the invention are more active, even after ageing at high temperatures, than the catalysts of EP 1 197 259 A1: consequently are endowed with a longer lifetime, and offer with respect to said catalysts a simpler method of preparation not requiring in the industrial scale operation, two impregnation steps after the impregnation made with the lanthanum nitrate solution.

The catalysts share with the catalysts described in EP 1 197 259 A1 the capability of the selective oxidation of VOC compounds to only $CO_2$. Furthermore, they are more active than the catalysts of EP 1 197 259 A1 in the decomposition of nitrogen protoxide to nitrogen and oxygen and in the combustion of CO, $H_2$ and $CH_4$ off gases from the anode of fuel cells.

The mixed oxides that form the active components of the catalysts have the characteristic of being p-type semiconductors (in these semiconductors, the conductivity increases exponentially with temperature according to an Arrhenius-type law and the charge vectors are electron vacancies). In these oxides, the gaseous oxygen is chemisorbed onto the surface and participates in the oxidation reaction together with the lattice oxygen.

The oxides are preferably used as supported on porous inorganic carriers such as alumina, silica, silica-alumina, titanium dioxide, magnesium oxide. Gamma alumina, in the form of microspheroidal particles with an average diameter of 30-80 microns, is the preferred carrier for using the catalysts in fluid-bed reactions. For fixed-bed reactions, preference is given to the use of carriers having a definite geometric shape, such as a hollow cylinder or a three-lobed cross-section cylindrical granule with mutually equidistant through bores at the lobes. The dimensions of the three-lobed granules are generally from 3 to 10 mm in height, the diameter of their circumscribed circumference is 5 to 10 mm, and the ratio between the geometric area and the volume of the solid part of the granule is greater than 1.3 $mm^{-1}$. The oxides are supported in an amount of generally 5 to 50% by weight, preferably 15-25% by weight.

The catalysts are prepared by impregnating the carrier initially with a solution of a salt of lanthanum or cerium or of another rare-earth metal, drying the carrier and then calcining it at a temperature around 600° C. The carrier is then impregnated with a solution of a salt of copper and manganese, subsequently drying at 120-200° C. and calcining up to 450° C.

Any soluble salt can be used.

Examples of salts are nitrates, formates and acetates. Lanthanum is used preferably as lanthanum nitrate $La(NO_3)_3$; copper and manganese are preferably used as nitrates, respectively $Cu(NO_3)_2$ and $Mn(NO_3)_3$. The preferred impregnation method is a dry impregnation, using an amount of solution equal to, or smaller than the volume of the pores of the carrier.

As already indicated, the catalysts selectively oxidize the VOC compounds to carbon dioxide: this occurs even when working for a limited time with an oxygen deficit with respect to the stoichiometric value required by the oxidation reaction.

With respect to catalysts based on noble metals, the catalysts according to the invention are characterized by greater thermal stability.

For example, after treatment at 1000° C. in dry air, while the complete conversion temperature rises slightly for the catalysts according to the invention, it rises considerably for catalysts based on noble metals, due to the remelting of the surface area caused by sintering of the metal particles that are present on the carrier.

The catalysts of the invention are used in the treatment of gaseous effluents particularly from plants for the production of nitric acid and adipic acid, which constitute the main industrial sources of generation of nitrogen protoxide; in the tire manufacture, asphalt blowing, wastewater treatment and offset printing. Another application of interest is the purification of gases from reactors for solid-state polycondensation of aromatic polyester resins e.g. polyethyleneterephthalate (the impurities are mainly constituted by ethylene glycol), in which the catalysts are capable of completely oxidizing the impurities with exclusive formation of carbon dioxide even when using the stoichiometric quantity of oxygen relative to the methane equivalents of the impurities that are present. In tests conducted by continuously feeding a nitrogen stream containing 1600 ppm of ethylene glycol on a fixed bed of the catalyst having the composition given in example 1, it was found that the ethylene glycol is removed quantitatively by using the stoichiometric amount of oxygen (5/2 moles per mole of glycol) working at 310° C. and with a space velocity of 10000 h$^{-1}$. Selectivity to $CO_2$ is complete.

When used to catalyze the decomposition of nitrogen protoxide the performance of the catalysts is improved with respect to the catalysts described in EP 1 197 259 A1.

Another application of the catalysts is the catalytic combustion of methane on thermal power stations for generating electricity. In this application, the catalysts have the advantage, with respect to combustion with a catalyst of a known type, that they can operate at lower temperatures at which NO is not generated: this allows to avoid the post-treatments for removal of this oxide that are instead required with known types of catalyst.

A further application is the removal of CO, $H_2$ and $CH_4$ off gases from anode in fuel cells, particularly molten carbonate fuel cells (MCFC), wherein a catalytic combustor is used to burn the anode tail gas to recover useful heat producing $CO_2$ for a recirculation systems in MCFC cells, and in general for lowering emission to environments.

The following examples are provided to illustrate but not to limit the scope of the invention.

EXAMPLE 1

A catalyst supported on gamma alumina is prepared having the following composition, expressed as a percentage by weight of the oxides listed below:
$La_2O_3$=36.5% w/w
MnO=39.3% w/w
CuO=24.2% w/w The preparation is performed by first impregnating with an aqueous solution of lanthanum nitrate ($La(NO_3)_3$) microspheroidal gamma alumina which is then dried at 110° C. and calcined at 600° C. Then the carrier is impregnated with an aqueous solution of manganese nitrate ($Mn(NO_3)_2$) and copper nitrate ($Cu(NO_3)_2$). This is followed by drying at 120-200° C. and calcining at 450° C. The carrier is impregnated by using an amount of solution equal to 100% of the volume of the pores of the carrier. The amount of supported oxides is 25% by weight.

The surface area (BET) of the catalyst was 110 m$^2$/g; porosity 0.40 cm$^3$/g.

Syngas combustion tests were carried out using fresh and at 900° C. aged catalyst. The results are reported in Table 1. Operating conditions: $CH_4$ 0.8%, CO 1.8%, $H_2$ 1.6%, $O_2$ 4%—Balance He.

COMPARISON EXAMPLE 1

The preparation of the catalyst of EXAMPLE 1 was repeated with the only difference that the catalysts had the following composition, expressed as percentage by weight of the oxides listed below:
$La_2O_3$=9.3%
MnO=53.2%
CuO=37.5%

Syngas tests were conducted using fresh and catalyst aged at 900° C.

The results are reported in Table 1.

The operating conditions were the same as in EXAMPLE 1.

EXAMPLE 2

The catalysts of EXAMPLE 1 and COMPARISON EXAMPLE 1 were used in tests of decomposition of $N_2O$. The results are reported in Table 2.

TABLE 1

Syngas Total Conversion Temperatures

| Catalysts | Total Conversion temperatures (° C.) | | |
|---|---|---|---|
| | CO | $H_2$ | $CH_4$ |
| Fresh Ex. 1 | 225 | 300 | 590 |
| Comp. Ex. 1 | 240 | 320 | 580 |
| Aged Ex. 1 | 275 | 350 | 650 |
| Comp. Ex. 1 | 300 | 385 | 720 |

TABLE 2

$N_2O$ Decomposition - Conversion Temperatures

| Catalysts | Conversion temperatures | | |
|---|---|---|---|
| | Start | Light-off (50%) | End (100%) |
| Fresh Ex. 1 | 380 | 480 | 590 |
| Comp. Ex. 1 | 430 | 520 | 620 |
| Aged Ex. 1 | 380 | 530 | 635 |
| Comp. Ex. 1 | 455 | 580 | 700 |

The disclosures in EPA No. 08168381.5 from which this application claims priority are incorporated herein by reference.

What is claimed is:

1. A mixed oxides catalyst comprising mixed oxides of manganese and copper, and at least one oxide of a rare-earth metal selected from the group consisting of $La_2O_3$ and $Nd_2O_3$, said catalyst having a percent composition by weight expressed as MnO, CuO, and at least one oxide of said rare-earth metal, respectively, of: 35-48%, 19-31% and 20-37%.

2. The catalyst according to claim 1, wherein said at least one oxide of the rare-earth metal is $La_2O_3$, and said catalyst comprises 40-48% of MnO, 26-30% of CuO and 26-30% of $La_2O_3$.

3. The catalyst according to claim 1, wherein said at least one oxide of the rare-earth metal is lanthanum oxide, and said lanthanum oxide is mixed with cerium oxide wherein the g-atom content of Ce is less than 50% the g-atom content of La.

4. The catalyst according to claim 1, wherein the mixed oxides of manganese and copper, and the at least one oxide of the rare-earth metal are supported on an inert porous inorganic carrier.

5. The catalyst according to claim 4, wherein the carrier has a porosity of more than 0.3 cm$^3$/g and a surface area of more than 30 m$^2$/g and is selected from alumina, silica and silica-alumina.

6. The catalyst according to claim 5, wherein said carrier is alumina, and wherein the alumina is gamma alumina in a form of microspheroidal particles or a hallow cylinder of single- or three-lobed cylindrical granules provided with a through bore at each lobe, parallel to the axis of each lobe.

7. The catalyst according to claim 5, wherein from 15 to 25% by weight of said oxides of manganese and copper, and at the least one oxide of the rare-earth metal are present on said support.

\* \* \* \* \*